G. P. HOUSTON.
Cooking Lamps.

No. 154,484.          Patented Aug. 25, 1874.

WITNESSES:
G. Matthys
Solon C. Kemon

INVENTOR:
Geo. P. Houston
BY
ATTORNEYS.

UNITED STATES PATENT OFFICE.

GEORGE PORTER HOUSTON, OF WASHINGTON, DISTRICT OF COLUMBIA.

IMPROVEMENT IN COOKING-LAMPS.

Specification forming part of Letters Patent No. 154,484, dated August 25, 1874; application filed July 22, 1874.

*To all whom it may concern:*

Be it known that I, GEORGE P. HOUSTON, of Washington city, District of Columbia, have invented a new and Improved Cooking-Lamp; and I do hereby declare that the following is a full, clear, and exact description of the same, reference being had to the accompanying drawing forming a part of this specification, in which—

Figure 1:
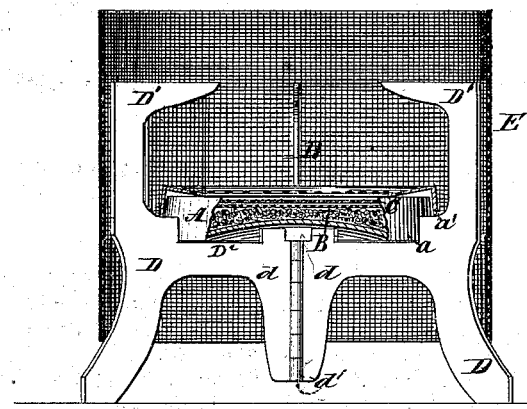
Figure 2:
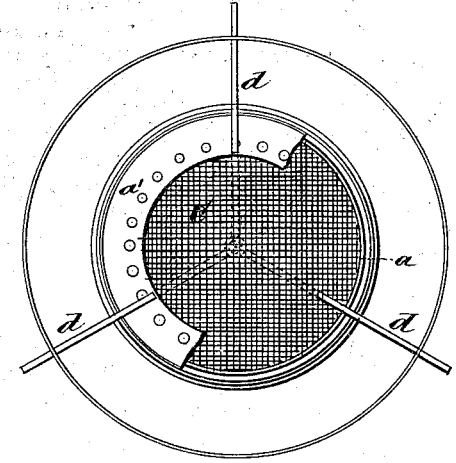
Figure 3:

Figure 1 is a sectional elevation of the lamp in condition for use; Fig. 2, a plan view of same partly broken away; and Fig. 3 an elevation of the same folded.

The invention will first be fully described, and then pointed out in the claim.

A represents an alcohol stove or burner, partially filled with some absorbent, B, and the latter protected with one or more wire-gauze disks or covers, C, the whole to repress and graduate the intensity of flame. This burner consists of two parts, the holder $a$, and the angled cap $a'$, the latter of which may be perforated near the inner edges. D is a support, intended to hold the burner at a convenient distance from the ground, and made in three parts, $d\ d\ d$, hinged to a common pintle, $d'$, being thus susceptible of folding up and of being stored away in a small space. The top and inward projections $D^1$ serve to hold the coffee-pot or other vessel above the flame, and the seat $D^2$ the burner.

The hunter or excursionist, being desirous of taking a meal, unfolds and sets up his support D, and places thereon his burner A. Upon this is located the coffee-pot or other vessel or utensil in which the eatable is to be cooked, and in a few minutes is prepared a savory meal.

If the wind blows, he draws a wire-gauze cylinder, E, partly or entirely over his cooking apparatus, and is not inconvenienced thereby.

Having thus described my invention, what I claim as new is—

The support D, constructed in three parts, $d\ d\ d$, hinged to a common pintle, $d'$, as and for the purpose set forth.

GEO. PORTER HOUSTON.

Witnesses:
CHAS. F. WILLIAMS,
SAMUEL STONE.